(12) United States Patent
Hsu et al.

(10) Patent No.: US 8,115,348 B2
(45) Date of Patent: Feb. 14, 2012

(54) UNIT COIL, COIL ASSEMBLY AND CORELESS TYPE LINEAR MOTOR

(75) Inventors: Ming-Che Hsu, Tainan County (TW); Chi-Wen Chung, Tainan County (TW); Yung-Ho Hsiao, Tainan County (TW); Wen-Jeng Wu, Tainan County (TW)

(73) Assignee: Chieftek Precision Co., Ltd., Tainan County (TW)

( * ) Notice: Subject to any disclaimer, the term of this patent is extended or adjusted under 35 U.S.C. 154(b) by 130 days.

(21) Appl. No.: 12/470,880

(22) Filed: May 22, 2009

(65) Prior Publication Data
US 2010/0295385 A1 Nov. 25, 2010

(51) Int. Cl.
*H02K 41/02* (2006.01)
(52) U.S. Cl. .................................................. 310/12.22
(58) Field of Classification Search ............... 310/12.21, 310/12.22, 198
See application file for complete search history.

(56) References Cited

U.S. PATENT DOCUMENTS

| 6,265,793 | B1 * | 7/2001 | Korenaga ................... 310/12.06 |
| 6,590,355 | B1 * | 7/2003 | Kikuchi et al. ............ 310/12.06 |
| 6,806,594 | B2 * | 10/2004 | Koyanagawa et al. ..... 310/12.04 |
| 2009/0127938 | A1 * | 5/2009 | Sahin Nomaler et al. ...... 310/12 |

* cited by examiner

*Primary Examiner* — Nguyen N Hanh
(74) *Attorney, Agent, or Firm* — Rosenberg, Klein & Lee

(57) ABSTRACT

The present invention discloses a unit coil, a coil assembly and a coreless type linear motor. The unit coil includes bent subcoils arranged adjacent to one another and disposed on a non-acting side axially. The coil assembly includes tri-phase unit coil modules arranged in an operating direction, and the tri-phase unit coil module is composed of three identical unit coils alternately stacked and sealed by a resin layer, and the unit coil is formed by bending and stacking sub-coils. The bent sub-coils are stacked to a sufficient thickness or arranged to a sufficient width to achieve the desired driving force, and then a magnetic rail is provided to form a coreless type linear motor. In the aforementioned structure, the unit coil composed by an alternately overlapping layout method effectively reduces the required space of the coil assembly, and the sub-coils can be manufactured easily and will not be damaged easily.

4 Claims, 27 Drawing Sheets

US 8,115,348 B2

UNIT COIL, COIL ASSEMBLY AND CORELESS TYPE LINEAR MOTOR

FIELD OF THE INVENTION

The present invention relates to a unit coil, a coil assembly and a coreless type linear motor, in particular to a unit coil including a plurality of bent subcoils arranged adjacent to one another and disposed on a non-acting side axially, and a winding and layout design and a wire connection method of the coreless type linear motor that includes the coil assembly and a magnetic rail.

BACKGROUND OF THE INVENTION

At present, there are three coil layouts of a coreless type linear motor, respectively: non-overlapping concentrated winding, overlapping concentrated winding and printed circuit board. With reference to FIGS. 9 and 10 for a concentrated winding layout, a plurality of unit coils 10 are concentrated and arranged, wherein each unit coil stands for a phase U, V, W of the linear motor and matches the magnetic pole pitch of a permanent magnet 101 to produce a driving force. The difference of non-overlapping windings as shown in FIG. 9 and overlapping windings as shown in FIG. 10 resides on whether or not the windings between the unit coils are overlapped; and a printed circuit board layout method as shown in FIG. 11 forms a coil 102 on a printed circuit board 103 by using a printed circuit board manufacturing technology. Due to the limitations of the space and the number of windings of the coil, the printed circuit board layout method can be applied to the design for small driving forces only. Although the non-overlapping concentrated winding layout method can produce a larger driving force, yet there are spaces not used effectively in the hollow portion of the coil. The overlapping concentrated winding layout method can fill the space that cannot be used in the non-overlapping concentrated winding layout method, and thus the overlapping concentrated winding layout method is better than the printed circuit board layout method and the non-overlapping concentrated winding layout method and capable of maximizing the driving force in a minimal space.

There are different common overlapping concentrated winding layout methods. For instance, a unit coil layout as disclosed in U.S. Pat. No. 4,758,750 adopts three unit coils stacked and fixed to an insulating element to form a flat tri-phase unit coil module, and then a plurality of flat tri-phase unit coil modules are arranged and assembled into a linear motor coil assembly. If it is necessary to produce a larger driving force by the aforementioned method, more flat tri-phase unit coil modules will be required, and thus the weight of the linear motor coil assembly will be increased substantially, and the insufficient strength at the joint between the flat tri-phase unit coil modules will reduce the overall rigidity.

In view of the foregoing shortcomings, a coil layout method disclosed in WO 2004/017500 A1 improves over the unit coil overlapping method, wherein the unit coil includes two vertical action sides and two axial non-action sides to constitute a closed loop. After the unit coil are bent appropriately, the unit coils are stacked alternately on the axial non-action sides and arranged closely with each other in an axial direction to form a tri-phase unit coil module. Since the plurality of tri-phase unit coil modules can be stacked alternately in the axial direction and arranged into a coil assembly without having the issue of insufficient rigidity at the joint of the flat tri-phase unit coil modules, therefore the drawback of a heavy linear motor coil assembly can be overcome. The unit coil must have a larger number of windings to produce a larger driving force, and thus the thickness or the width of the unit coil will be increased, and the thicker unit coil will make the bending process more difficult. Furthermore, the thickness of a bent unit coil is at least 1.5 times of the original thickness of the unit coil in order to achieve the overlapping effect. When the linear motor coil assembly is assembled, each unit coil is connected in series-parallel, and the reserved space is provided for placing the connecting wires. Therefore, a larger space for the thickness is required at the position of the axial non-action side, and at least twice of the thickness of unit coil is added to the thickness of the reserved wire connection space to give the total thickness at the axial non-action side of the coil assembly. If the unit coil with a larger width is bent to the axial non-action side, the width will become the increase of the length of the coil, and a larger space for the increased length is required.

With reference to FIG. 12 for a common single unit coil 7 used for the overlapping to form a tri-phase unit coil module 31, the thickness of the axial non-action side of the formed unit coil 7 is equal to the sum of twice of T6 and the thickness T7 for the reserved space for the wire connection. However, the larger the thickness T6 of the formed unit coil 7, the more difficult is the formation, and the greater is the difference between the radii of internal bends R31, R33 and the radii of external bends R32, R34. The smaller radii of internal bends R31, R33 will result in a poor insulation.

In FIGS. 13(a) and 13(b), if the width of the unit coil 8 is larger, and the width is assumed to be W3, then the width of the coil will become the height W3 of the two rear axial non-action sides of the formed coil, and thus the total height of the coil will become larger, and the height of the linear motor coil assembly 3 as shown in FIG. 1 will increase.

In FIGS. 14(a) and 14(b), the sub-coil 9b is formed by a common winding method such as the vertical overlapping method, and thus its hollow portion 92 is not tapered but arranged vertically upward. In other words, the lengths L4 and L5 of the hollow portion of the coil are equal (L4=L5), such that after the coil 9b is bent and formed, the common formed sub-coil 9b' as shown in FIG. 14(c) is tilted at the end of the axial non-action side 93', since the length of internal sides of the formed coil 9b' are equal (L4'=L5'), and the length of the external side L5' includes a larger radius of bend R5', and the length of the internal side L4' includes a smaller radius of bend R4'. As a result, the external side of the axial non-action side 93' of the formed coil 9b' is tapered to a greater extent than the internal side as shown in FIG. 14(d). The required thickness of the linear motor coil assembly 3 is increased due to the tilted axial non-action side 93'.

With reference to FIG. 15 for a method of connecting wires between the unit coils of a common coil assembly, a method of connecting equivalent circuits in series is adopted to produce a larger driving force as shown in FIG. 15(a), or a method of connecting equivalent circuits in parallel is adopted to provide a higher speed as shown in FIG. 15(b), or a method of connecting equivalent circuits in series-parallel is adopted to produce a linear motor with different characteristics as shown in FIG. 15(c). However, these wire connection methods are applicable for the wire connection between unit coils only. Other methods must be used to achieve the expected characteristics of the linear motor.

SUMMARY OF THE INVENTION

Therefore, it is a primary objective of the present invention to provide a unit coil, and the unit coil includes a plurality of bent subcoils arranged adjacent to one another and disposed on a non-acting side axially, such that the thickness of the subcoils can be reduced, and the radius of curvature of the bent subcoils can be increased, so as to lower the level of difficulty of bending the subcoils and make the manufacturing easier.

Another objective of the present invention is to provide a design for a coil assembly of a linear motor, such that the unit coil of the coil assembly can be formed easily regardless of its thickness, and the radius of curvature can be increased to improve the insolubility when the sub-coils are formed, so as to enhance the life expectancy of the sub-coils.

A further objective of the present invention is to provide a design of a coil assembly to effectively reduce the thickness and length of the axial non-action side required for the process of bending the coil, so as to provide a space-saving coil assembly.

Another further objective of the present invention is to provide a space-saving coreless type linear motor.

To achieve the foregoing objectives, the present invention provides a coreless type linear motor comprising a magnetic rail and a coil assembly, wherein the magnetic rail includes two rows of oppositely arranged permanent magnets to constitute a row of alternately positive and negative magnetic field areas, and an action space reserved between the two rows of oppositely arranged permanent magnets, and the coil assembly includes a plurality of tri-phase unit coil modules alternately stacked in an axial direction, and a resin layer sealed onto the tri-phase unit coil module, and the resin layer is disposed in an action space of the magnetic rail, and the tri-phase unit coil modules include three identical unit coils, and the unit coil includes a plurality of sub-coils arranged adjacent to one another and having at least one bend on the axial non-action side. The coil assembly is interacted with the magnetic flux produced by a tri-phase current and a driving force produced by a magnetic field of the magnetic rail. If the magnetic rail is fixed to become a stator, then the coil assembly will act as a rotor.

The unit coil comprises a plurality of sub-coils wound by an insulating wire continuously into a ring-shaped body with a vertical action side and an axial non-action side, and the plurality of sub-coils are arranged side by side with one another and include a bend at the axial non-action side. The side-by-side arrangement includes the following modes: a plurality of sub-coils with an equal width and stacked in the thickness-wise direction; a plurality of sub-coils with an equal thickness alternately disposed in the width-wise direction and attached with one another closely; and a plurality of sub-coils with unequal widths and installed concentrically.

In the method of forming the unit coils with an equal thickness and a larger width, a plurality of bent sub-coils with a smaller thickness on the axial non-action side are stacked in the thickness-wise direction by arranging and bending the plurality of sub-coils. Since the sub-coils have a smaller thickness, and the radius of curvature required for the bend can be increased, therefore the level of difficulty for bending the coil can be reduced significantly for an easy manufacture. In addition, the sub-coils have a smaller thickness to provide a larger radius of curvature required for the bend, so that the sub-coil will not be damaged easily at the bending position, and the heat generated by current passing through the sub-coil will not be accumulated at the bending position of the sub-coil easily, so as to enhance the life expectancy of the sub-coils and the unit coils. The use of a unit coil formed by stacking sub-coils with a smaller thickness has no limitation on its thickness, and a sufficient thickness of the unit coil can be formed by stacking more sub-coils according to the required driving force, and thus the unit coil will not be bent easily by a single unit coil. In the plurality of sub-coils used for forming the unit coil, an upper-layer sub-coil can reduce the vertical length appropriately. In other words, the upper-layer coil has a vertical length smaller than the vertical length of a lower-layer coil, and the cross-sectional area on the axial non-action side of the upper-layer sub-coil of the unit coil is disposed above the total thickness of the unit coil, and thus the overall thickness of the formed unit coil can be reduced.

The method of forming the unit coil by bending and arranging a plurality of sub-coils arranges a plurality of sub-coils with a smaller width and having a bend on the axial non-action side into a unit coil with an equal thickness and a larger width, and stacks the sub-coil on the axial non-action side and in the thickness-wise direction, such that the vertical length of the unit coil can be reduced, and the total height of the coil assembly of the linear motor can be adjusted appropriately.

The method of forming the unit coil by bending and arranging a plurality of sub-coils arranges a plurality of sub-coils with different sizes concentrically and a smaller width with a bend at the axial non-action side by a concentric layout method to form a unit coil with an equal thickness and a smaller width. The sub-coils are stacked on the axial non-action side and in the thickness-wise direction, such that the vertical length of the unit coil can be reduced, and the total height of the coil assembly of the linear motor can be adjusted appropriately without increasing the thickness.

The two methods of forming the unit coil by bending and arranging a plurality of sub-coils can be used together as a combination to achieve the objectives of the present invention.

The sub-coils before the bending takes place can be (but not necessarily) tapered in the thickness-wise direction of the axial non-action side, such that the sub-coils before the bending takes place and being tapered in the thickness-wise direction axially along the non-acting side can be aligned neatly. When the sub-coils are wound, the sub-coils can be wound in advance to provide a tapered thickness according to the expected size of the bend. The tapered sub-coil refers to a sub-coil having a vertical length on a side greater than the vertical length on another side along the thickness-wise direction, such that the thickness of the sub-coil before the bending takes place is tapered in the thickness-wise direction of the vertical length. After the bent sub-coils are tapered in the thickness-wise direction, the axial non-action side of the formed sub-coil is in an equaling shape, and thus the thickness required for bending the sub-coil can be reduced.

Since the unit coil is formed by stacking a plurality of side-by-side arranged sub-coils, therefore each sub-coil of the unit coil can be connected more flexibly. For example, a driving force constant of a linear motor coil assembly with the sub-coils connected in series is higher than the driving force constant of a linear motor coil assembly with the sub-coils connected in parallel, provided that a same current is supplied to the coil assembly. Correspondingly, the back EMF constant of a linear motor coil assembly with the sub-coils connected in parallel is smaller than the back EMF constant of a linear motor coil assembly with the sub-coils connected in series. Another method is the series-parallel wire connection, and different driving force constants and back EMF constants can be produced according to the result of an equivalent circuit. In general, the wires between the unit coils of a linear motor can be connected in series, in parallel or in series-parallel to achieve a linear motor of a different characteristic. Each sub-coil of the unit coil of the present invention can be connected in series, in parallel or in series-parallel. If each sub-coil of the unit coil is connected in parallel, then the linear motor will produce a higher speed. On the other hand, if each sub-coil of the unit coil is connected in series, then the linear motor will produce a larger driving force. Therefore, each sub-coil of the unit coil can be connected in series, in parallel or in series-parallel to provide diversified characteristics of the linear motor.

DETAILED DESCRIPTION OF THE PREFERRED EMBODIMENTS

The present invention will now be described in more detail hereinafter with reference to the accompanying drawings that show various embodiments of the invention as follows.

Figure 1:
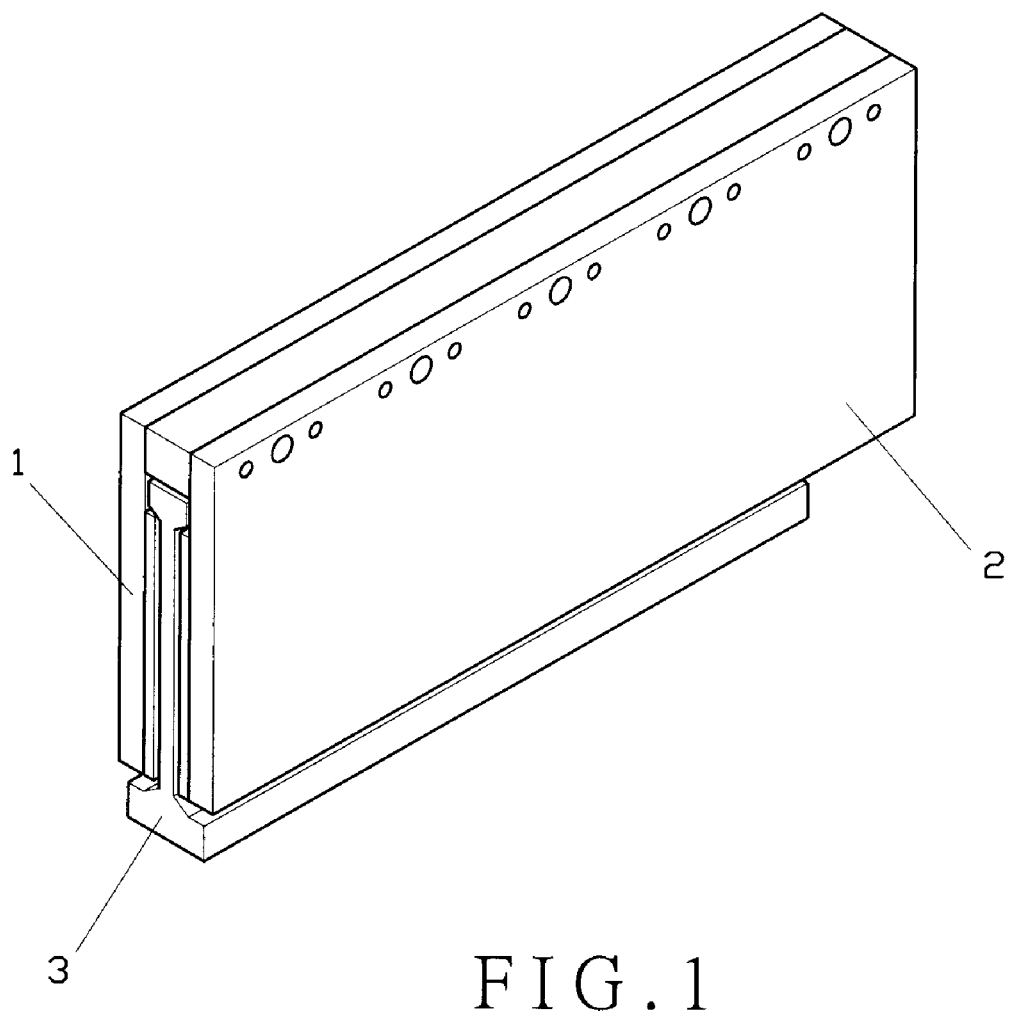
FIG. 1 is a perspective view of a magnetic rail and a coil assembly of a coreless type linear motor.
Figure 2:
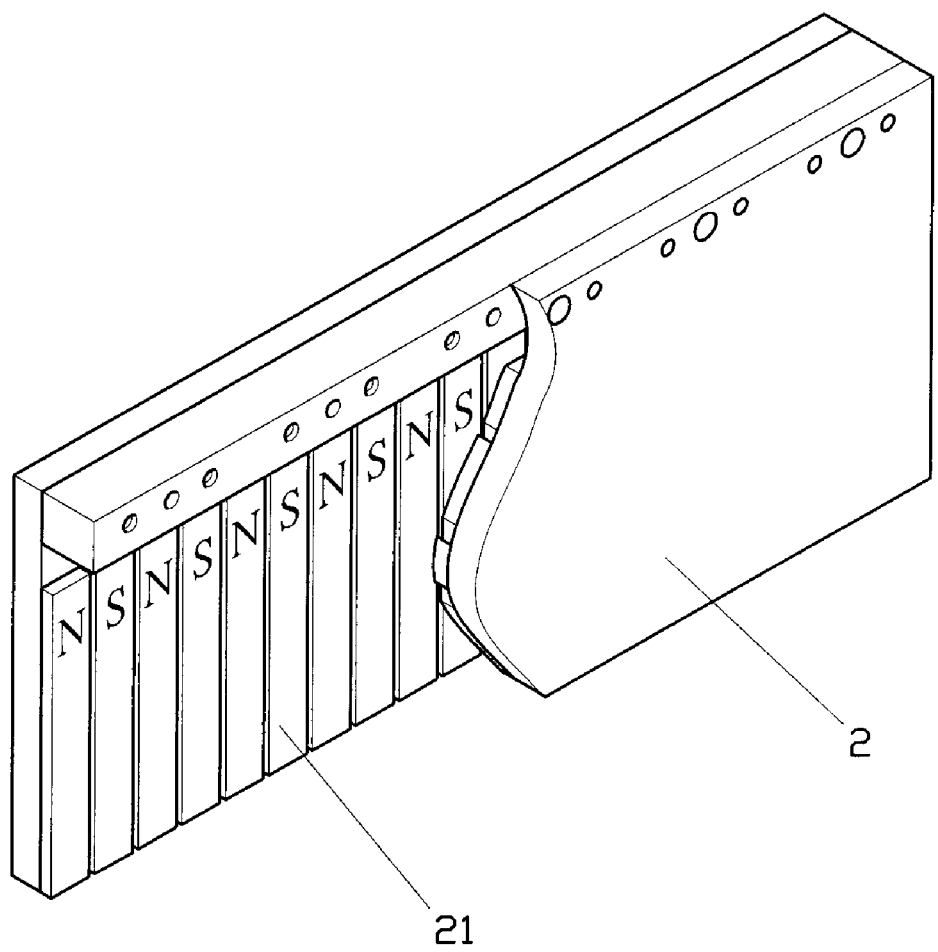
FIG. 2 is a schematic view of a layout of permanent magnets of a magnetic rail of a coreless type linear motor.
Figure 3A:
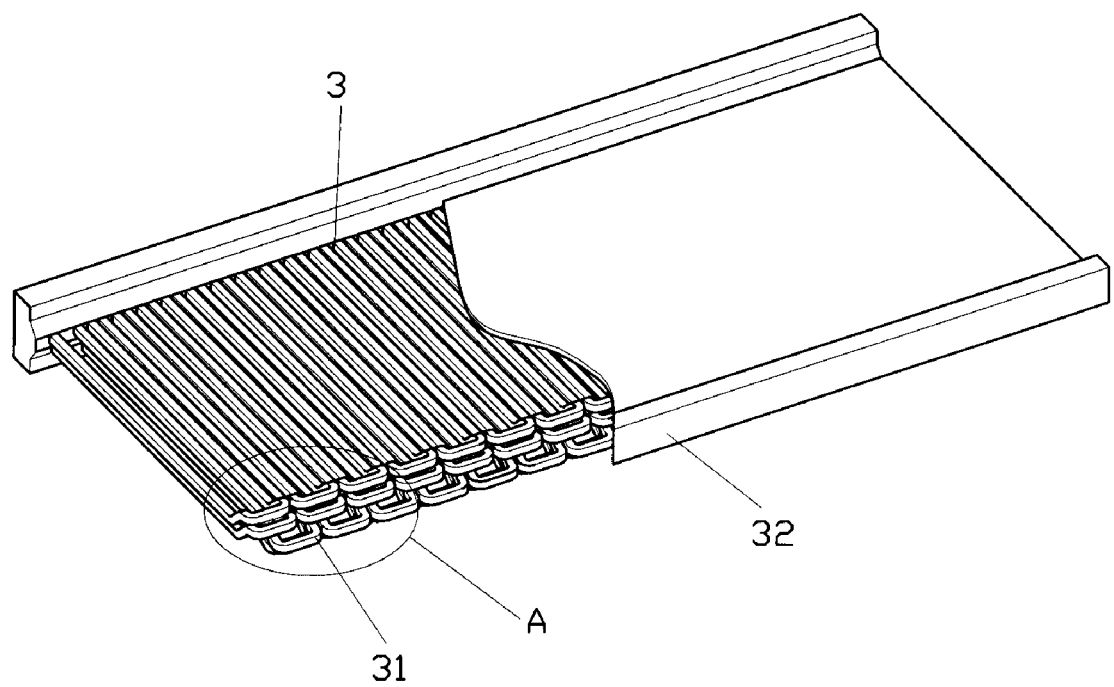
FIG. 3(a) is a structural view of a coil assembly of a coreless type linear motor in accordance with the present invention.
Figure 3B:
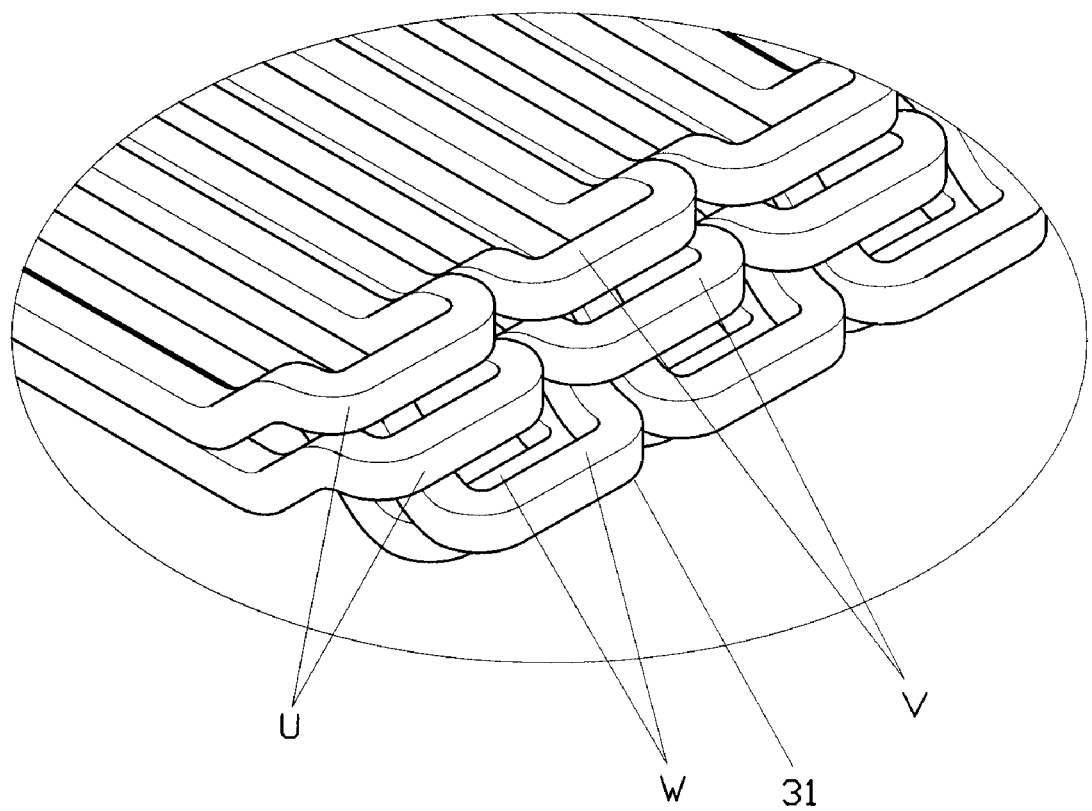
FIG. 3(b) is a partial enlarged view of a portion A as depicted in FIG. 3(a)

In FIG. 1, a coreless type linear motor 1 comprises a magnetic rail 2 and a coil assembly 3, wherein the magnetic rail 2 includes two rows of oppositely arranged permanent magnets 21 as shown in FIG. 2 for forming a row of alternately opposite magnetic areas. In FIGS. 3(a) and 3(b), the coil assembly 3 is formed by alternately stacking a plurality of tri-phase (U, V, W) unit coil modules 31 in an axial direction, and then sealing the tri-phase unit coil modules 31 by a resin layer 32.

Figure 4A:
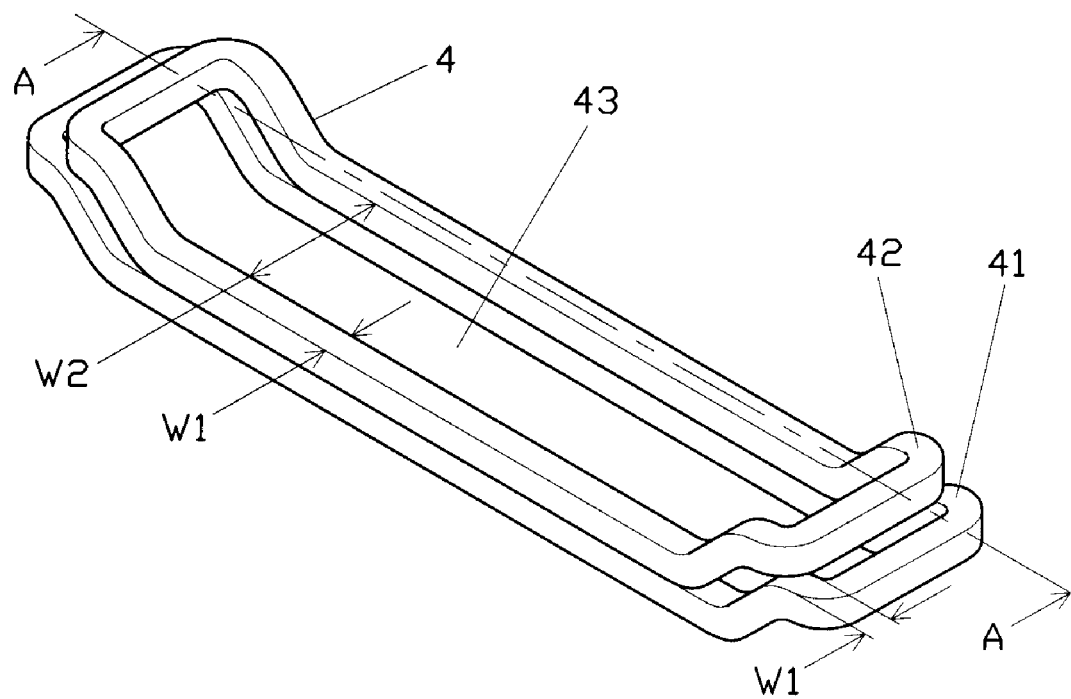
FIG. 4(a) is a perspective view of a unit coil module of a coreless type linear motor in accordance with a first preferred embodiment of the present invention.
Figure 4:
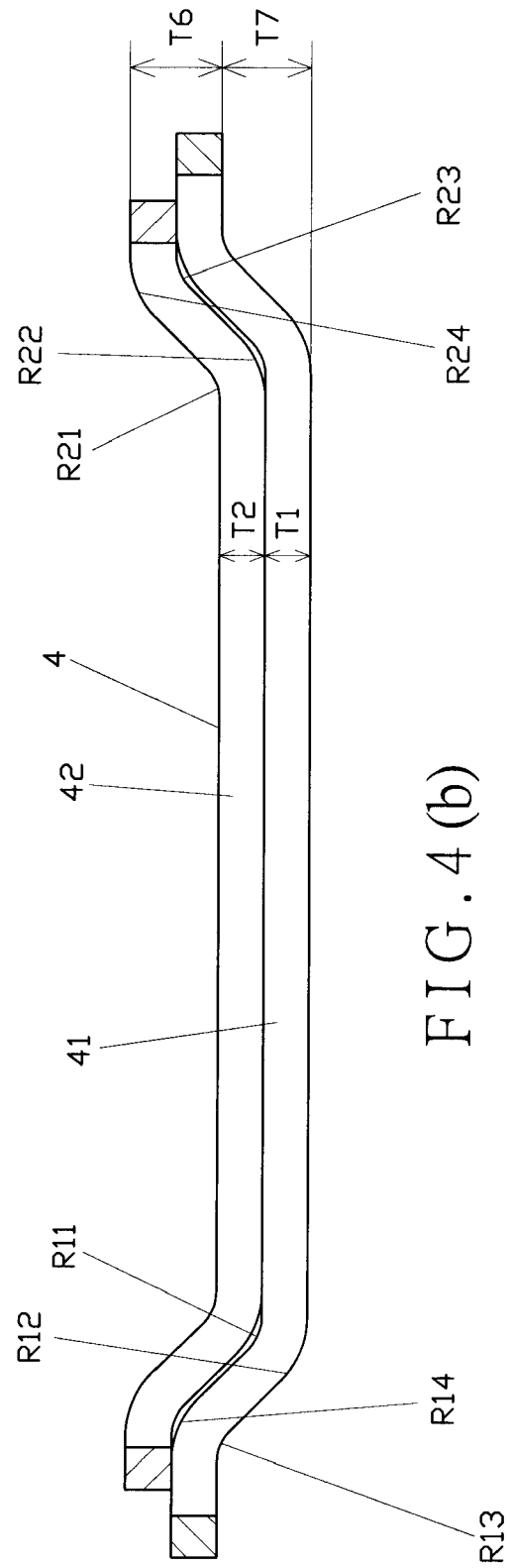
FIG. 4(b) is a cross-sectional view of Section A-A of FIG. 4(a)
FIG. 4(c) is a perspective view of a tri-phase unit coil module of a coreless type linear motor in accordance with the present invention.
FIG. 4(d) is a bottom view of FIG. 4(c)
FIG. 4(e) is a front view of FIG. 4(c)
Figure 4:
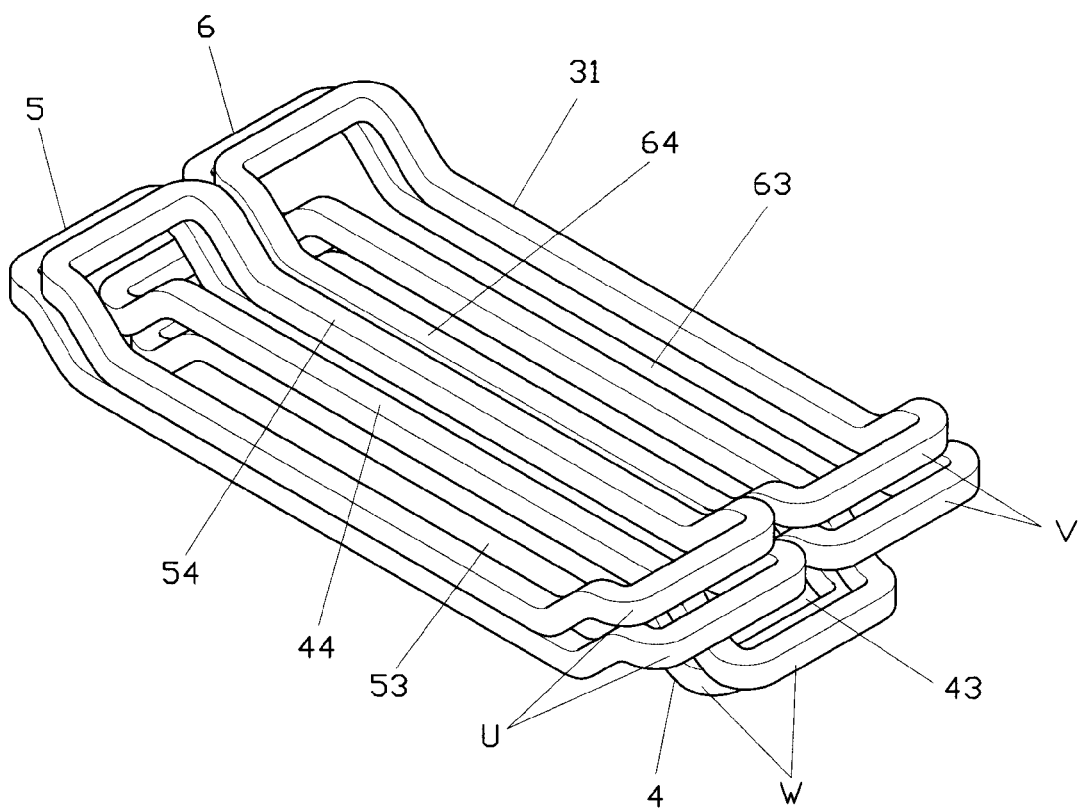

With reference to FIGS. 4(a) and 4(b) for a preferred embodiment of the present invention, a unit coil 4 with an equal width and a thickness equal to T1+T2 is formed by stacking two sub-coils 41, 42 with an equal width and an equal thickness T1, T2 and having a bend on the axial non-action side. Since the thickness of each sub-coil 41, 42 is small, therefore the sub-coils 41, 42 can be bent easily. The lower-layer sub-coils 42, 41 can be used for forming a unit coil with an equal width and an equal thickness by stacking two or more sub-coils with a bend on the axial non-action side and along the thickness-wise direction. Since the sub-coils have a smaller thickness, therefore the difference between the radii of external and internal bends R11–R12, R13–R14, R21–R22, R23–R24 of the sub-coils 41, 42 is smaller, and the formed coil unit maintains a good insulation effect, and the coil unit can be formed, but will not be damaged easily.

Figure 4D:
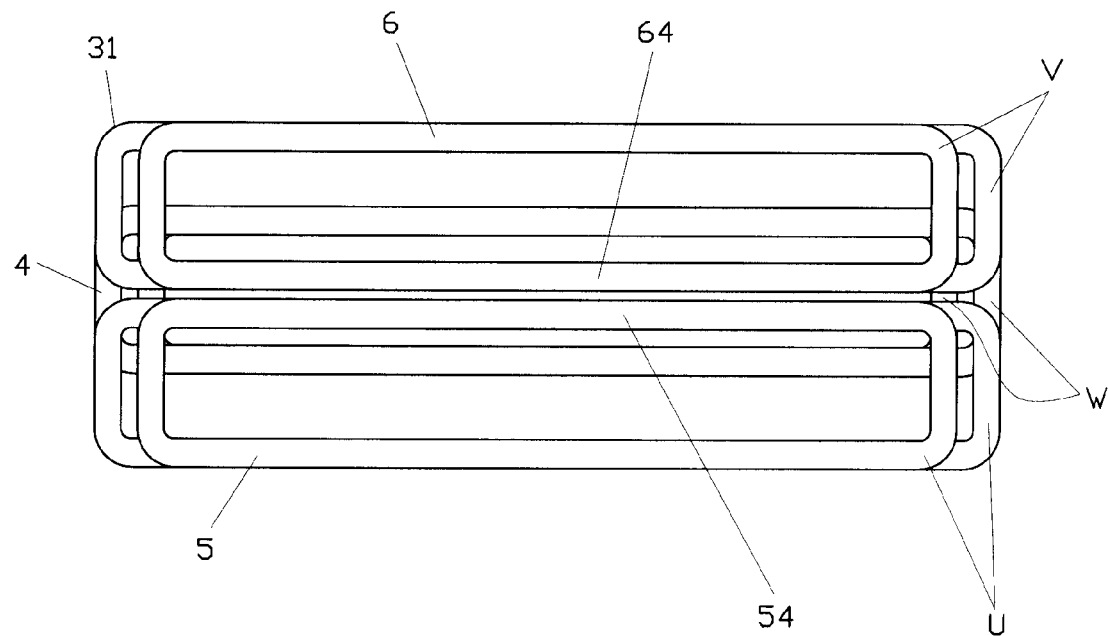
Figure 4E:
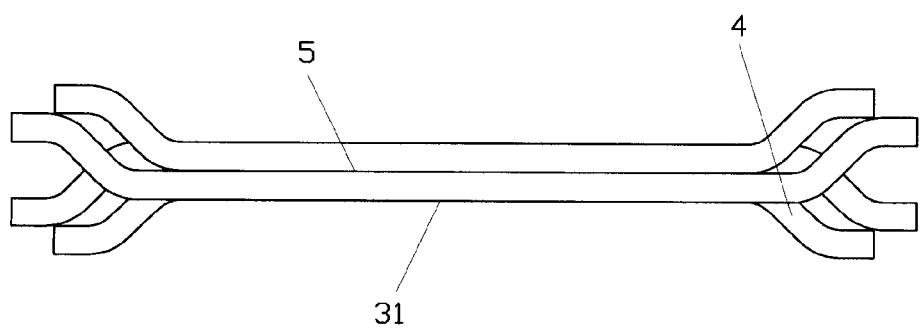

In FIG. 4(a), the unit coil 4 has a width of W1, and the hollow portion 43 has a width of W2, wherein W2 is at least twice of W1. In FIGS. 4(c), 4(d) and 4(e), the unit coils 5, 6 are identical to the unit coil 4, and the unit coil 4 with a phase W is installed in an opposite direction, and the vertical action side 44 faces upward. Two vertical action sides 54, 64 of the unit coil 5 with a phase U and the unit coil 6 with a phase V are arranged closely adjacent to each other and then paced into the hollow portion 43 of the unit coil 4 to form alternately arranged tri-phase unit coil modules 31 with a total thickness equal to each unit coil 4, 5, 6, and so on, in order to form the coil assembly 3 of the linear motor by alternately, closely and axially combining the plurality of tri-phase unit coil modules 31.

Figure 5:
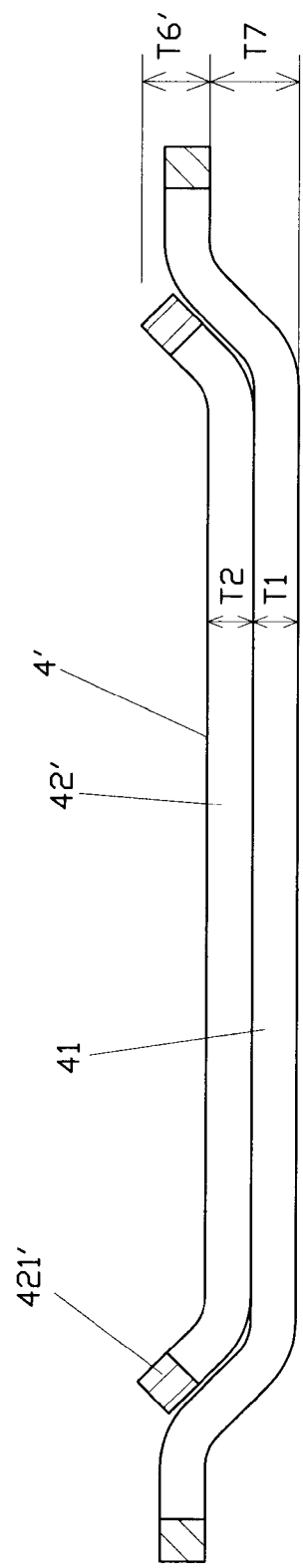
FIG. 5 is a cross-sectional view of a coreless type linear motor unit coil in accordance with a second preferred embodiment of the present invention.

The unit coil 4 with a plurality of layers as shown in FIG. 4(a) can be improved to provide a second preferred embodiment as shown in FIG. 5, wherein the lower-layer sub-coil 41 remains unchanged, and the length of the original upper-layer sub-coil 42 is reduced to form a shorter sub-coil 42' and a unit coil 4', wherein the cross-section 421' on the axial non-action side of the shorter sub-coil 42' is disposed above the total thickness T1+T2 of the unit coil in order to avoid any interference caused when the unit coils 4' are stacked alternately to form a tri-phase coil module 31. Therefore, the original thickness T6+T7 of the axial non-action side of the formed unit coil 4 can be reduced to T6'+T7, and further reduced to the final thickness of the linear motor coil assembly 3.

Figure 6A:
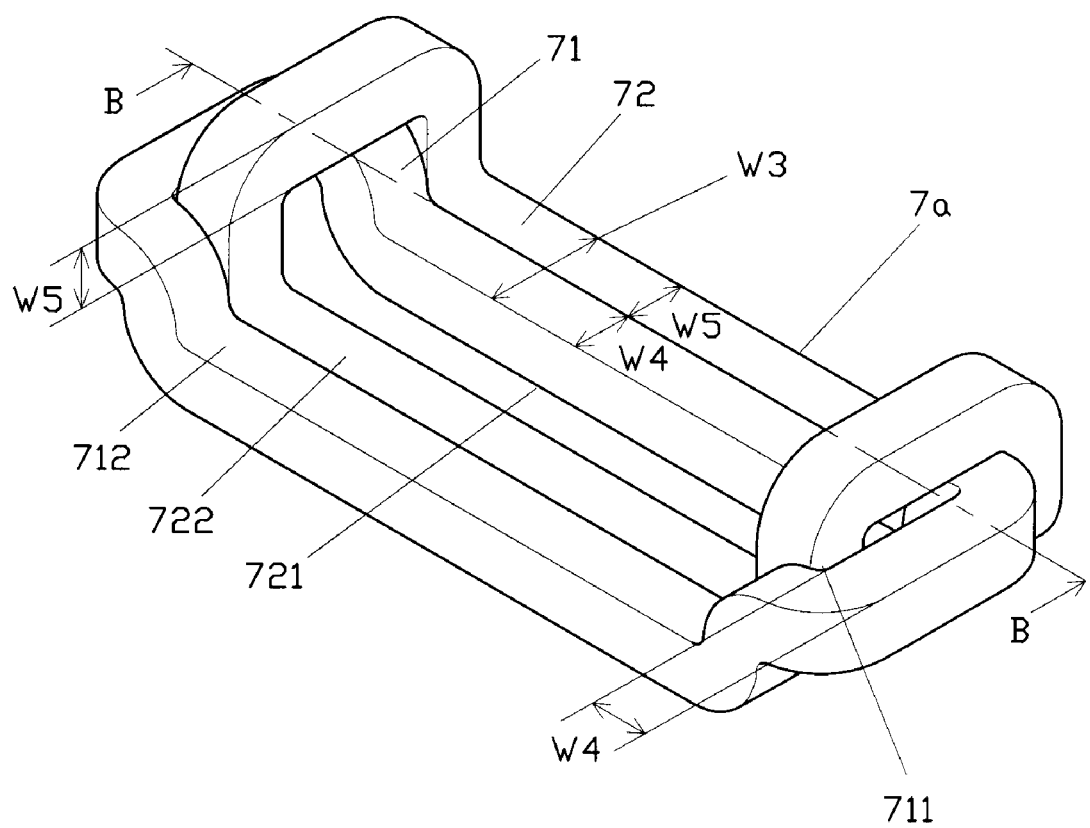
FIG. 6(a) is a perspective view of a coreless type linear motor unit coil in accordance with a third preferred embodiment of the present invention.
Figure 6:
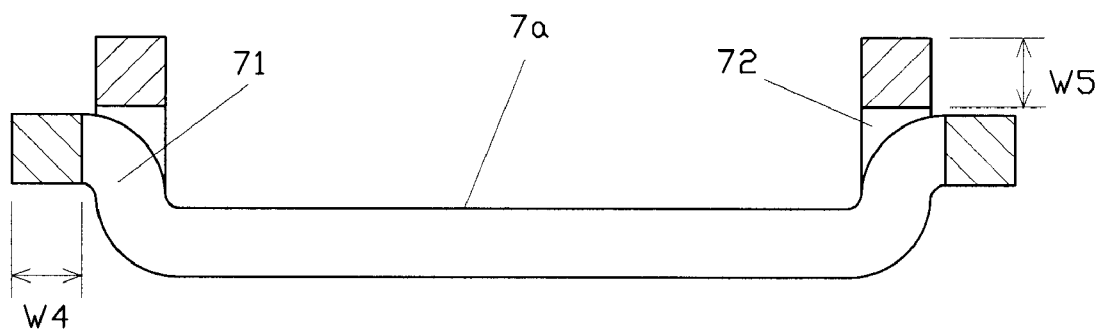
FIG. 6(b) is a cross-sectional view of Section B-B of FIG. 6(a)
FIG. 6(c) is a perspective view of an assembled tri-phase unit coil module.
Figure 6C:
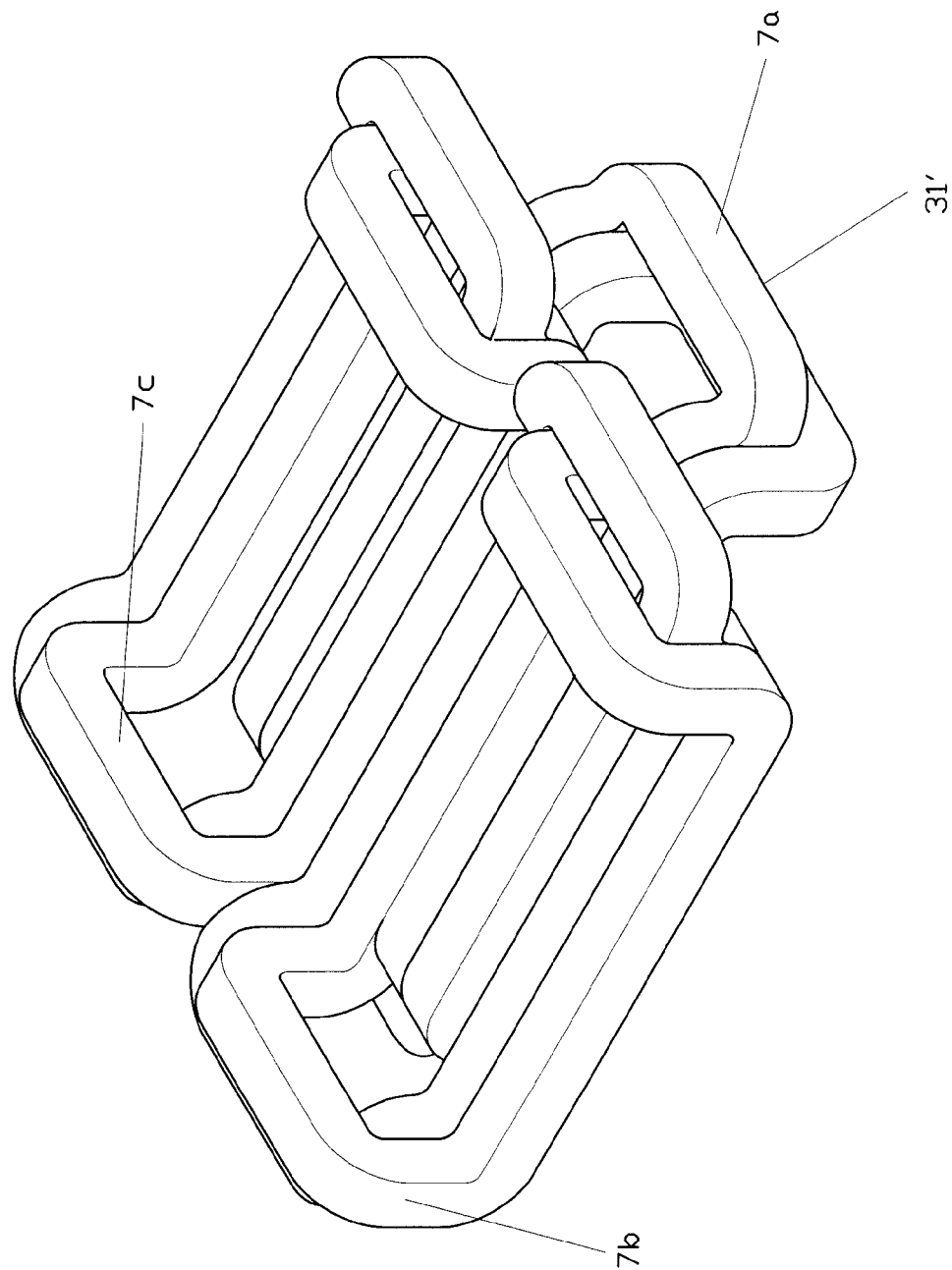
Figure 13:
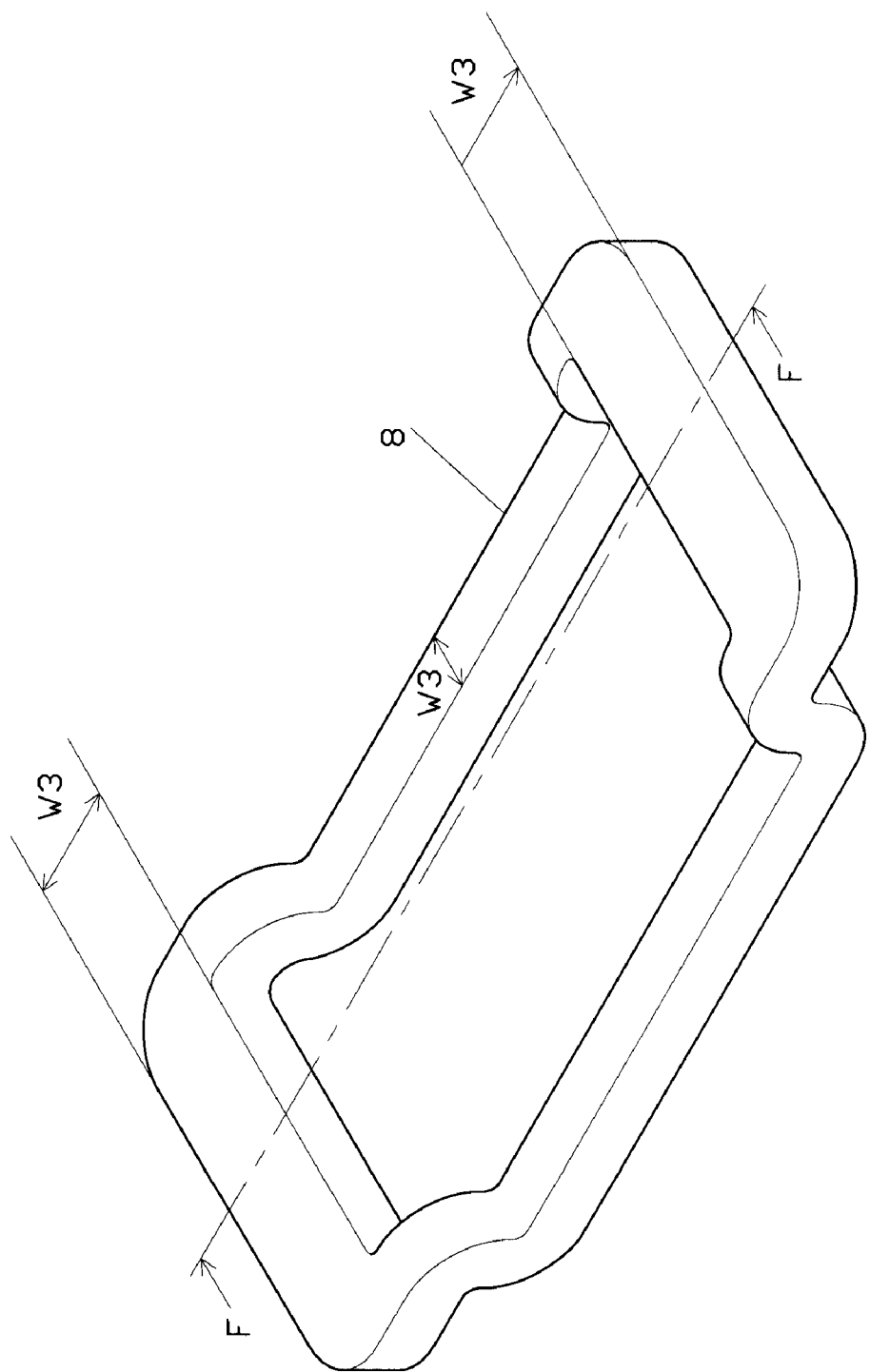
FIG. 13(a) shows a common unit coil with a larger width.
FIG. 13(b) a cross-sectional view of Section F-F of FIG. 13(a)
Figure 13:
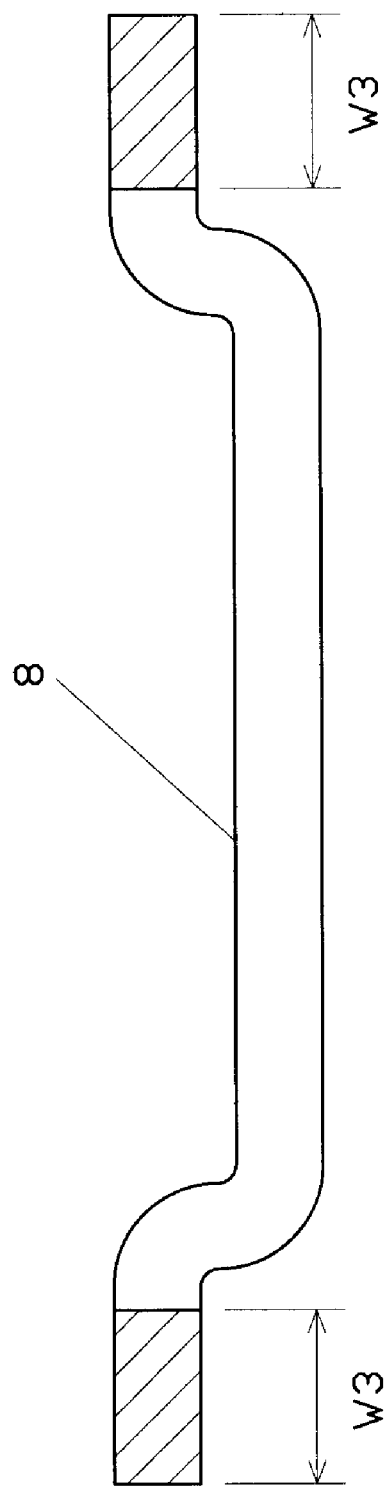
Figure 14:
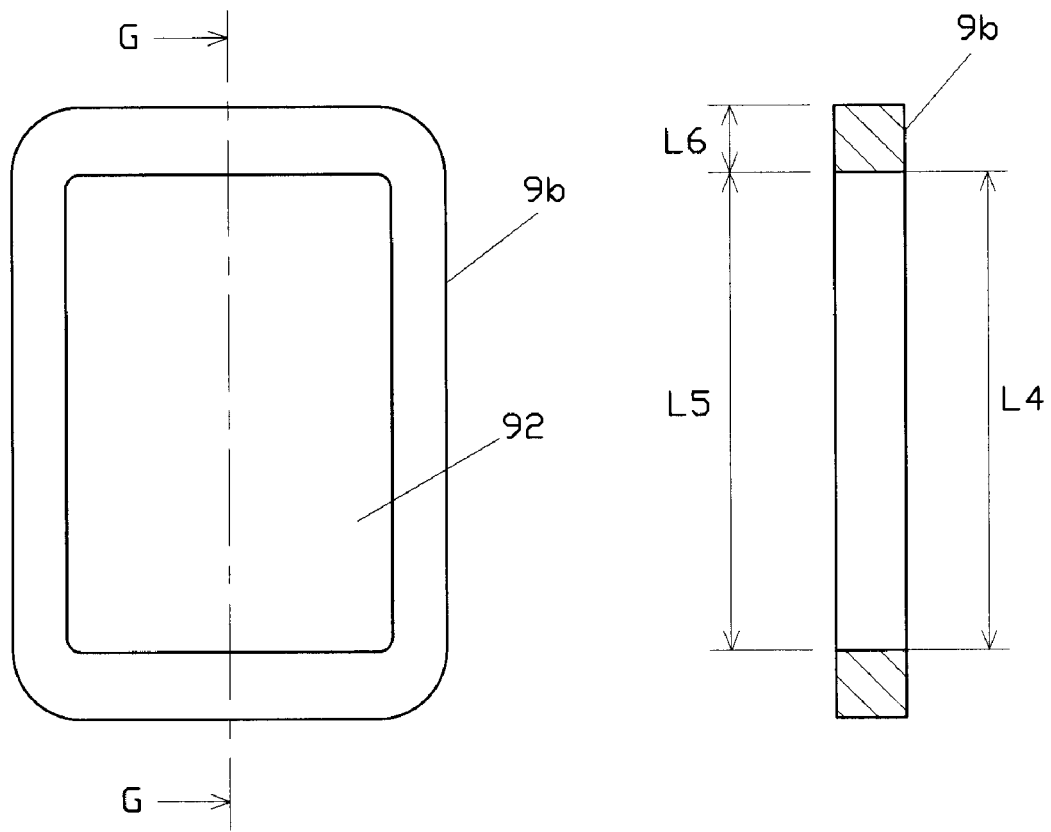
FIG. 14(a) is a front view of a common coil.
FIG. 14(b) a cross-sectional view of Section G-G of 14(a)
FIG. 14(c) is an oblique view of a common coil.
FIG. 14(d) a cross-sectional view of Section H-H of FIG. 14(c)
Figure 14:
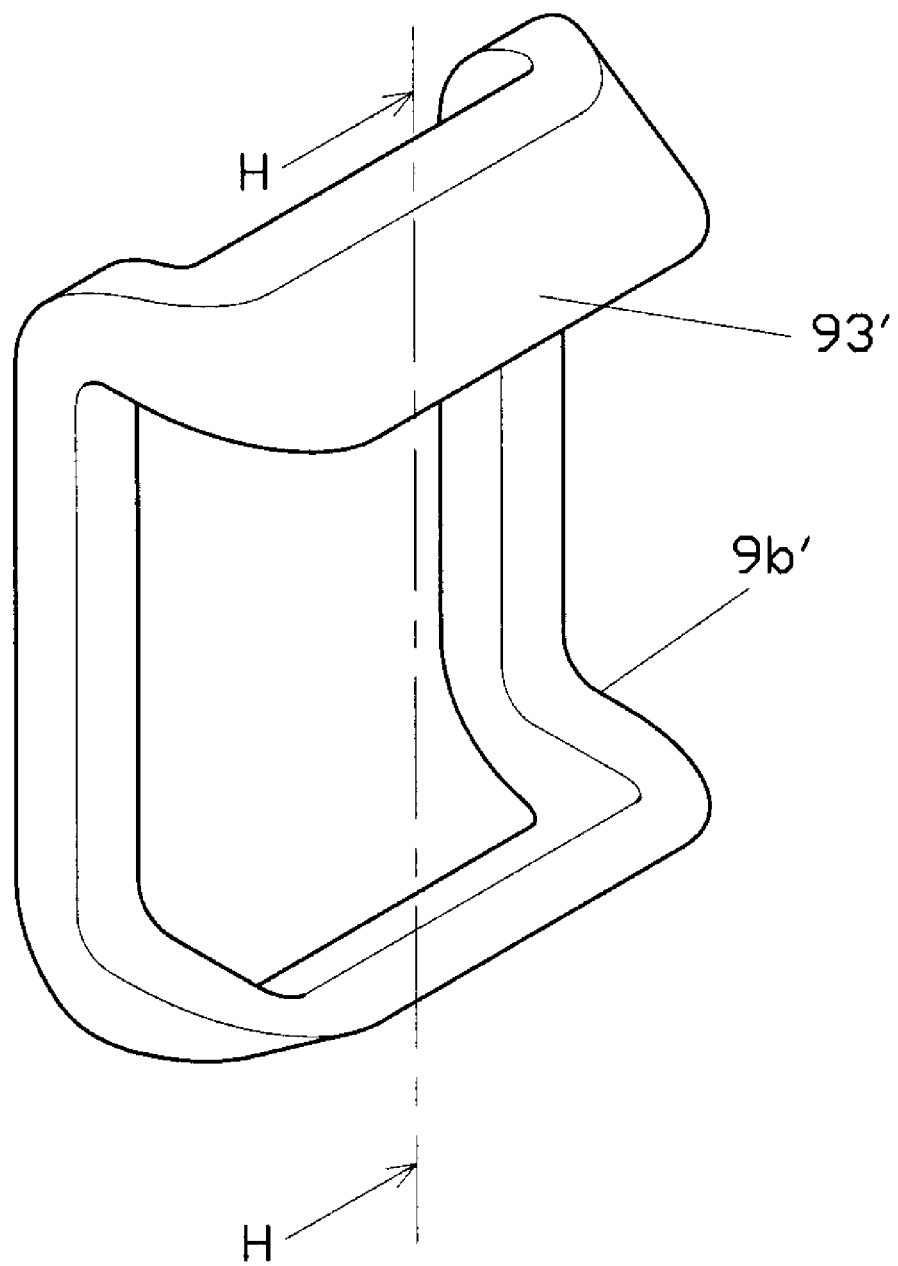
Figure 14:
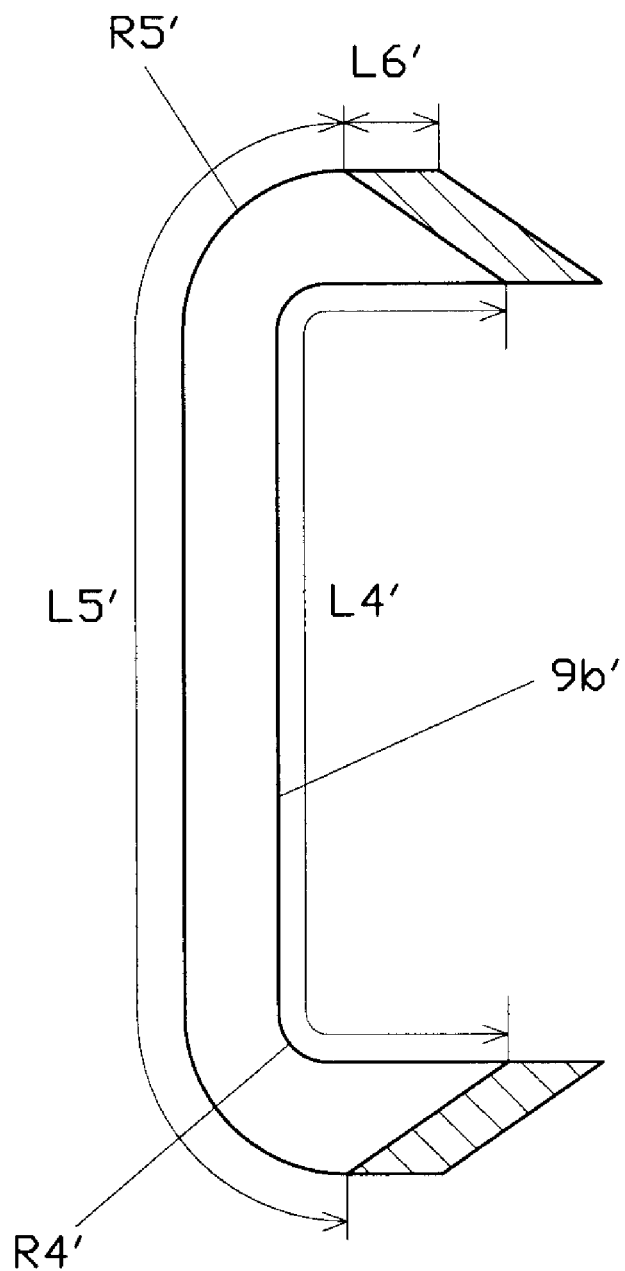

In a third preferred embodiment of the present invention as shown in FIG. 6(a), two sub-coils 71, 72 are alternately and closely arranged in an axial direction to form a unit coil 7 with an equal thickness and a larger width, wherein the sum of the widths W4, W5 is equal to W3 as shown in FIG. 13. The formed sub-coils 71, 72 have hollow portions 711, 721 respectively for containing a vertical action side 722 of the sub-coil 72 in the hollow portion 711 of the sub-coil 71, and then the vertical action side 712 of the sub-coil 71 is equalized, and the upper edges of the vertical action sides 712, 722 of the sub-coils 71, 72 are equalized to form the unit coil 7a. Compared with the conventional unit coil 8 as shown in FIG. 13, the unit coil 7a of the present invention is wound to a position such that the length W4 of the axial non-action side is smaller than the length W3 of the axial non-action side of the unit coil 8 when the unit coil 8 is wound, so as to reduce the height of the assembled coil assembly 3, wherein the decreased length W5 can be allocated to the increase of the thickness for adjusting the increase of the height and the thickness. The two sub-coils 71, 72 can be the sub-coils having two or more bends on the axial non-action side and alternately and closely arranged in an axial direction to form a unit coil 7a with an equal thickness and a larger width. With reference to FIG. 6 for a brief schematic view of two narrower sub-coils 71, 72, the actual bending angle is not necessarily equal to 90 degrees. In FIG. 6(c), the aforementioned tri-phase unit coil modules 31 are used for forming unit coils 7a, 7b, 7c to produce a tri-phase unit coil module 31'

Figure 7A:
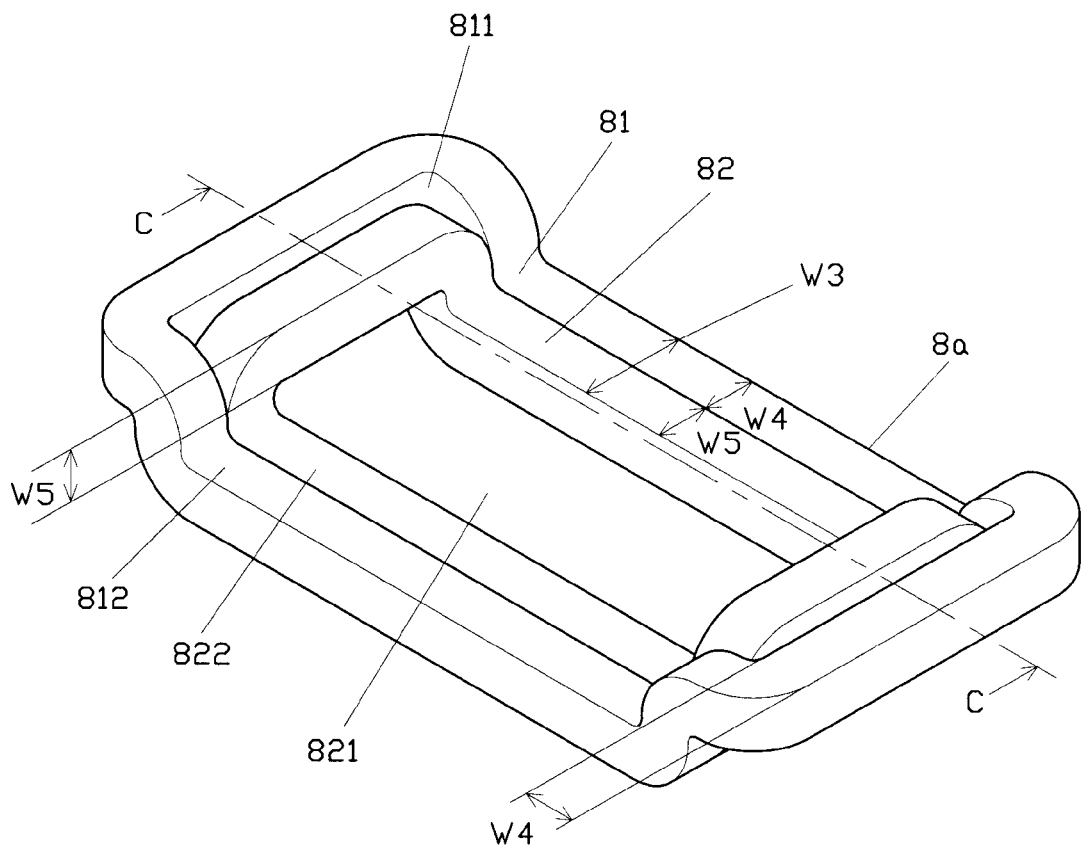
FIG. 7(a) is a perspective view of a coreless type linear motor unit coil in accordance with a fourth preferred embodiment of the present invention.
Figure 7B:
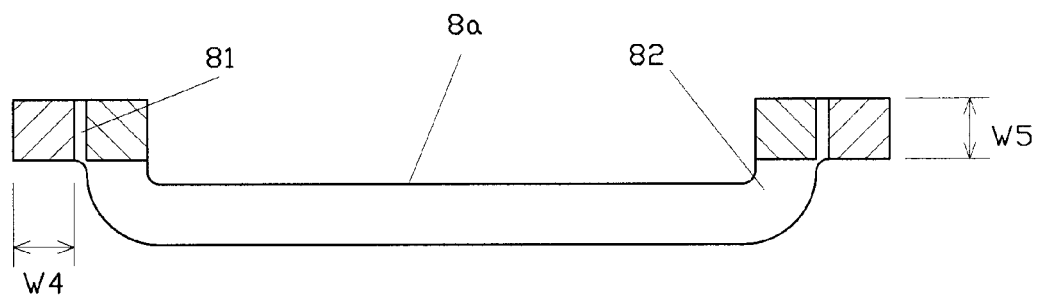
FIG. 7(b) is a cross-sectional view of Section C-C of FIG. 7(a)
Figure 7C:
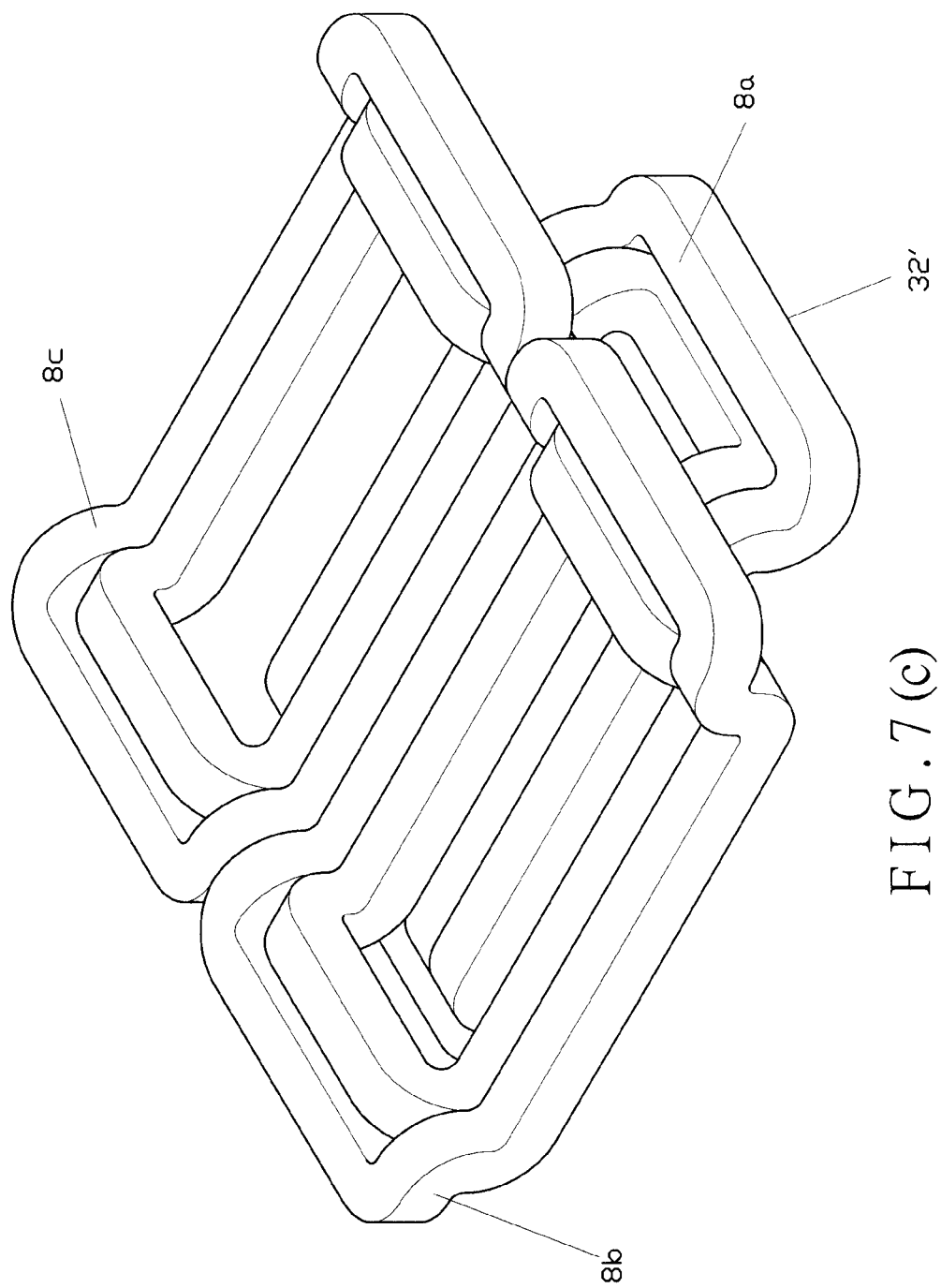
FIG. 7(c) is a perspective view of an assembled tri-phase unit coil module.

In a fourth preferred embodiment of the present invention as shown in FIG. 7, the width is divided into an external sub-coil 81 and an internal sub-coil 82, wherein the internal sub-coil 82 with a width W5 is placed in a hollow portion 811 of the external sub-coil 81 with a width W4 to form a unit coil 8a with an equal thickness and an equal width W3 as shown in FIG. 7(a). This preferred embodiment not just reduces the length of the unit coil 8a wound to the axial non-action side to W4 only, but also maintains the thickness of the axial non-action side at W5 as shown in FIG. 7(b). This preferred embodiment can arrange two or more different sized circular sub-coils concentrically to form a unit coil 8a with an equal thickness and a larger width. Similarly, the unit coils 8b, 8c can be used to form a tri-phase unit coil module 32' as shown in FIG. 7(c).

Figure 8A:
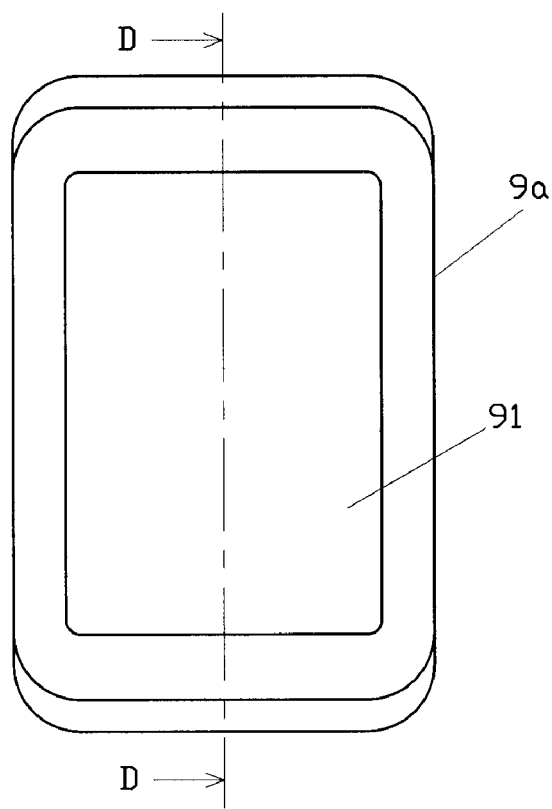
FIG. 8(a) is a front view of a sub-coil tapered along its thickness in accordance with the present invention.
Figure 8B:
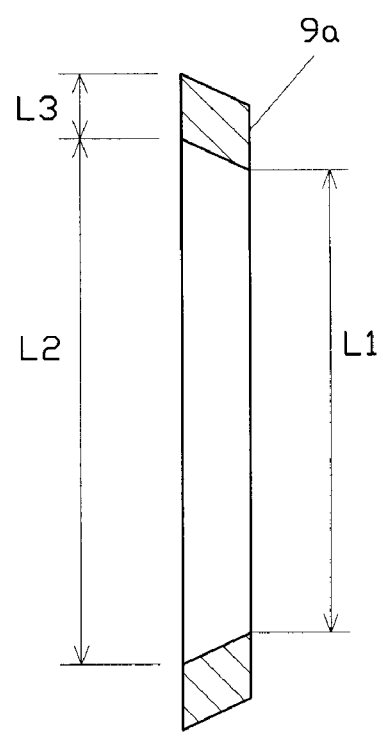
FIG. 8(b) is a cross-sectional view of Section D-D of FIG. 8(a)
Figure 8C:
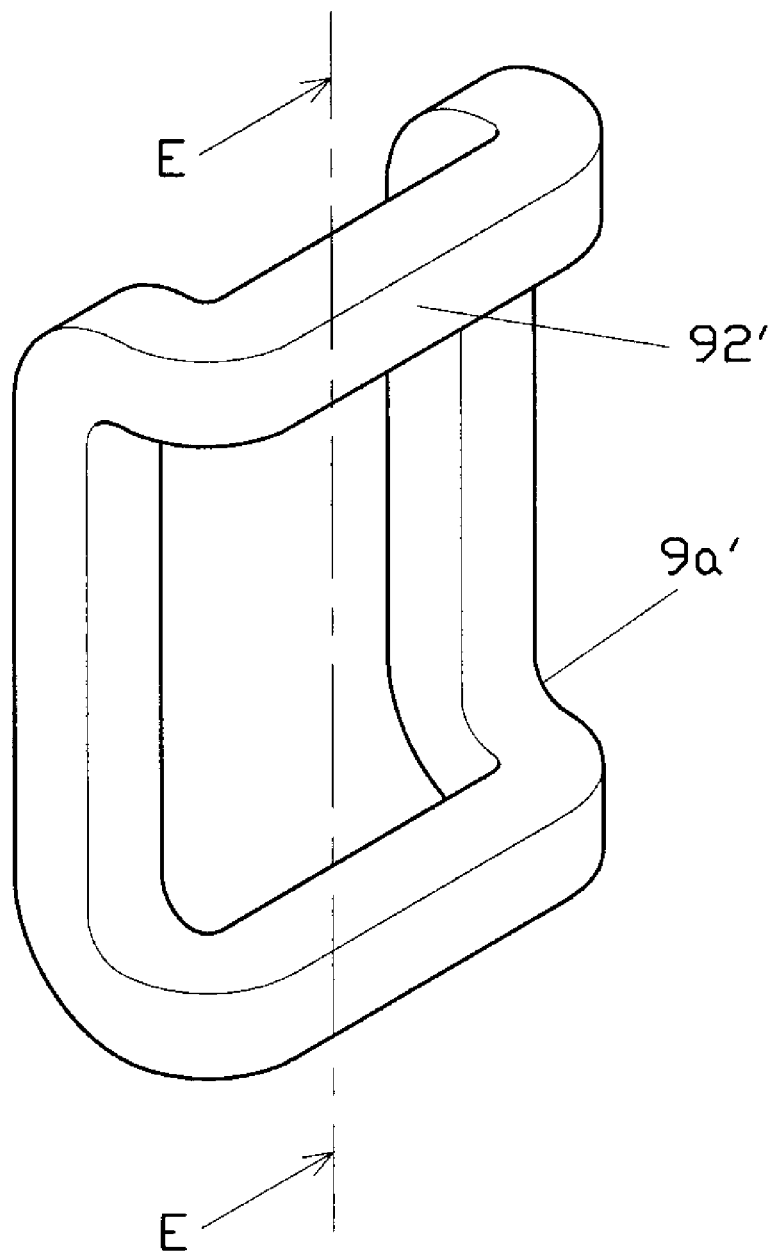
FIG. 8(c) is a perspective view of a coil formed in FIG. 8(a)
Figure 8:
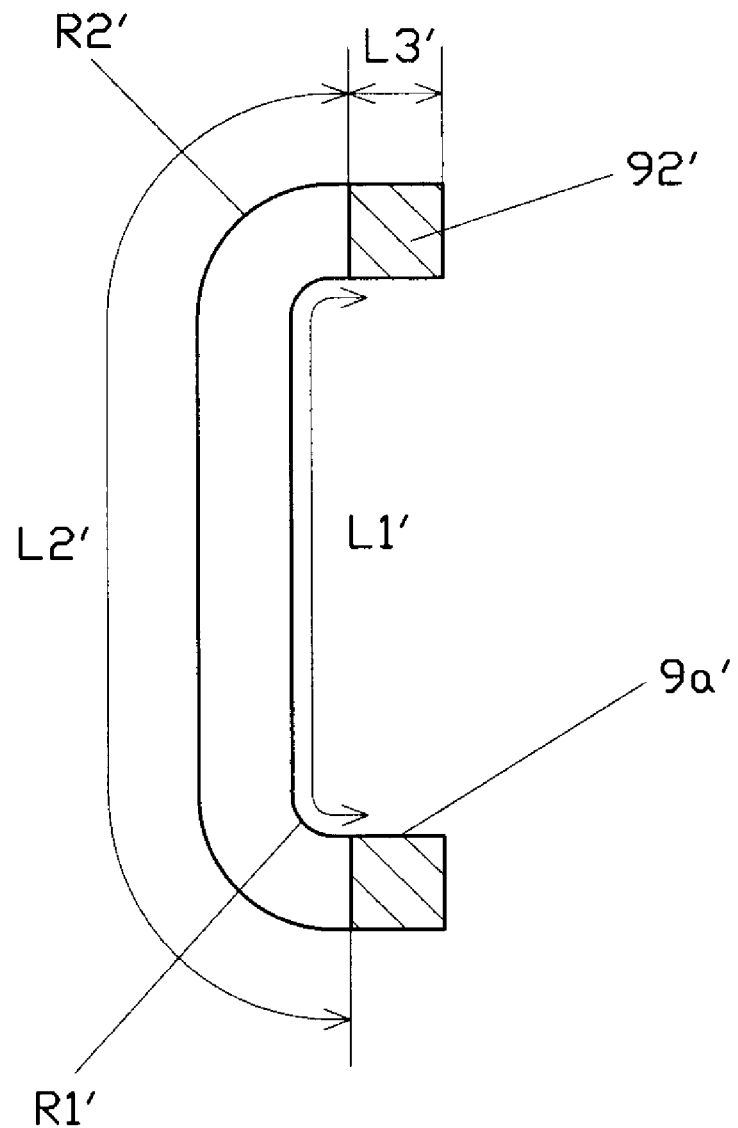
FIG. 8(d) is a cross-sectional view of Section E-E of FIG. 8(c)
Figure 9:
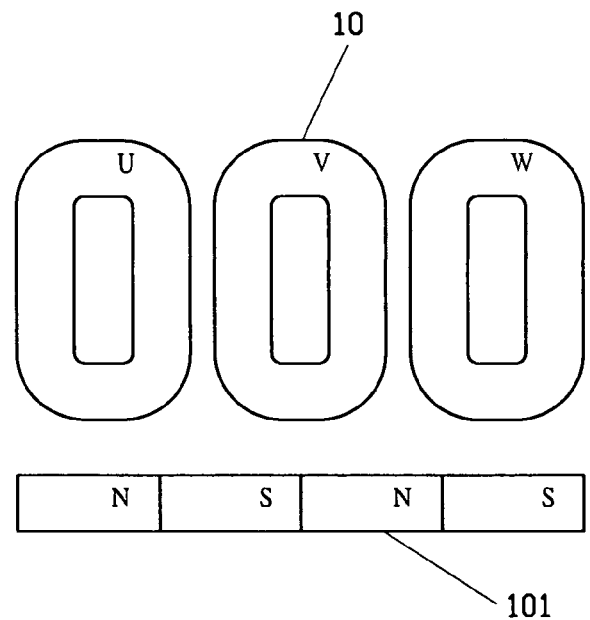
FIG. 9 is a schematic view of a coil layout with non-overlapping concentrated windings.
Figure 10:
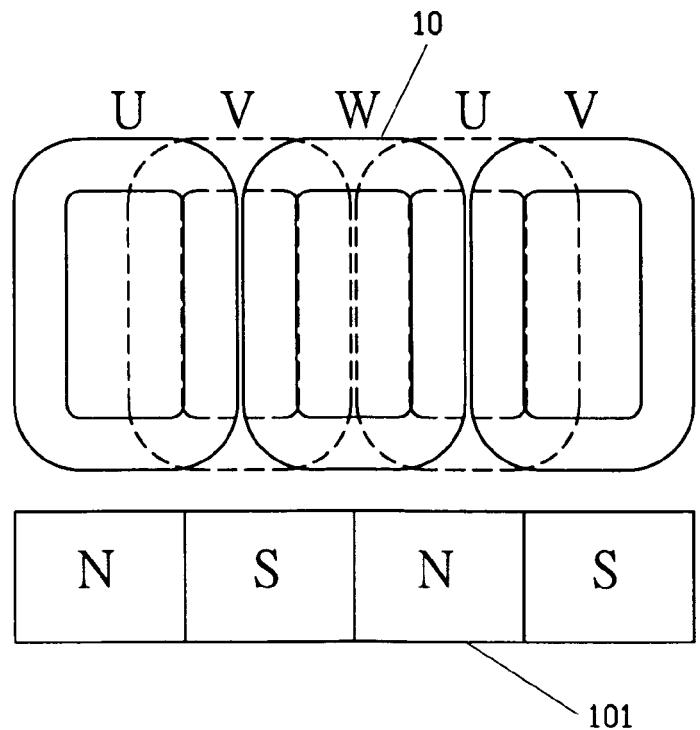
FIG. 10 is a schematic view of a coil layout with overlapping concentrated windings.
Figure 11:
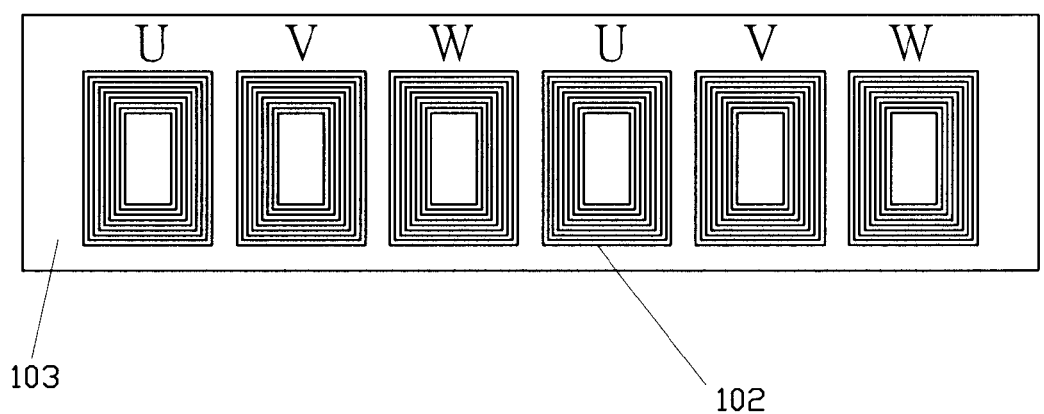
FIG. 11 is a coil layout of a printed circuit board.
Figure 12:
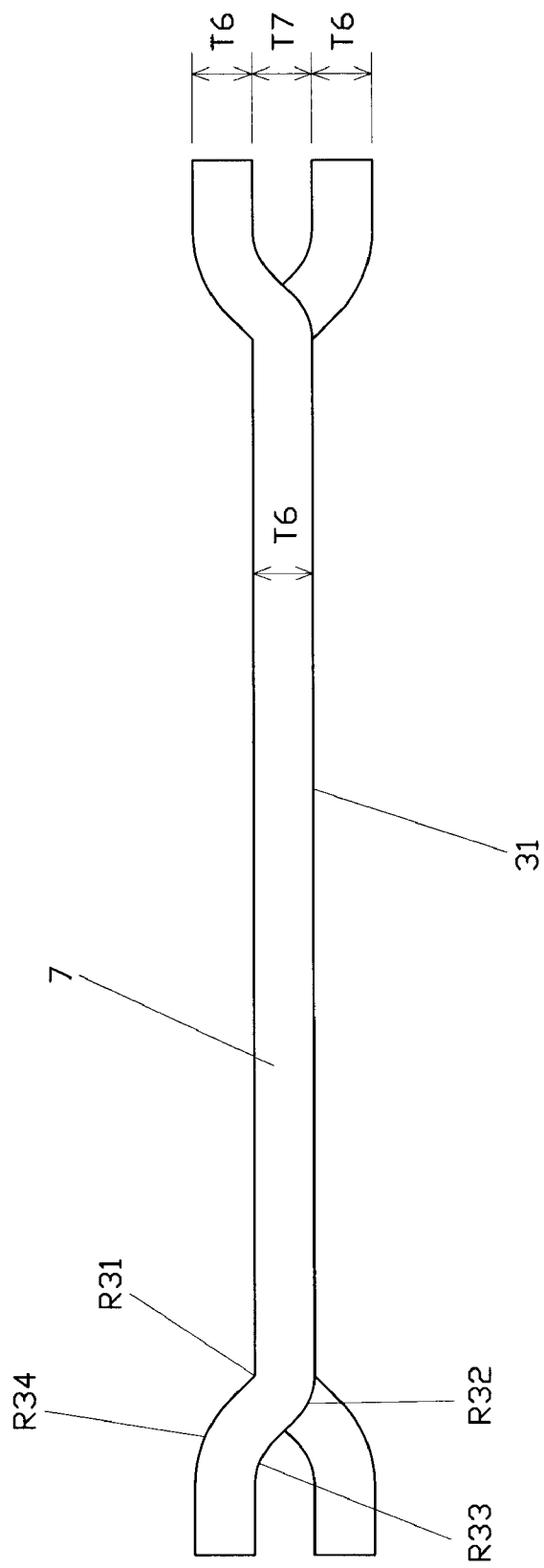
FIG. 12 is a front view of a common overlapping concentrated type coil assembly.

In FIG. 8, a hollow portion 91 of a sub-coil 9a can be wound to have a tapered shape along the thickness-wide direction according to the shape of an expected bend when the improved sub-coil 9a of the present invention is wound. In other words, L2>L1, wherein L2=L1+(R2'−R1')π, and thus after the sub-coil 9a is bent to become a sub-coil 9a', the length of the hollow portion of the sub-coil 9a' still remains to L1=L1', L2=L2' and L3=L3', wherein L1' has included the axial non-action side 92' of the sub-coil into the total length (R2'−R1')π, so as to reduce the total length. The axial non-action side 92' of the formed sub-coil 9a' is in an equaling shape. Such improvement can facilitate the assembly and arrangement of the linear motor coil assembly 3 and the reduction of the thickness.

Figure 15:
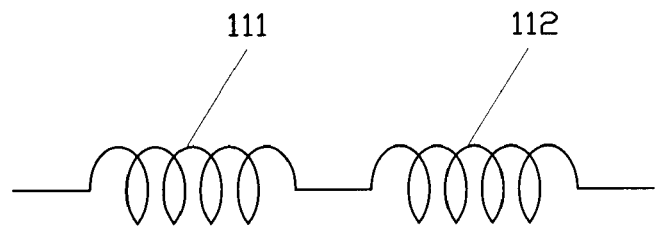
FIG. 15(a) is a schematic view of an equivalent circuit connected in series with a sub-coil of a unit coil.
FIG. 15(b) is a schematic view of an equivalent circuit connected in parallel with a sub-coil of a unit coil.
FIG. 15(c) is a schematic view of an equivalent circuit connected in series-parallel with a sub-coil of a unit coil.
Figure 15:
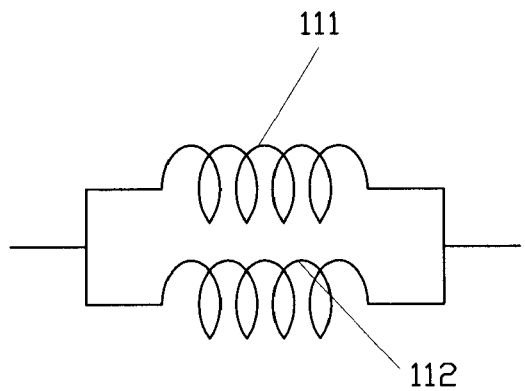
Figure 15:
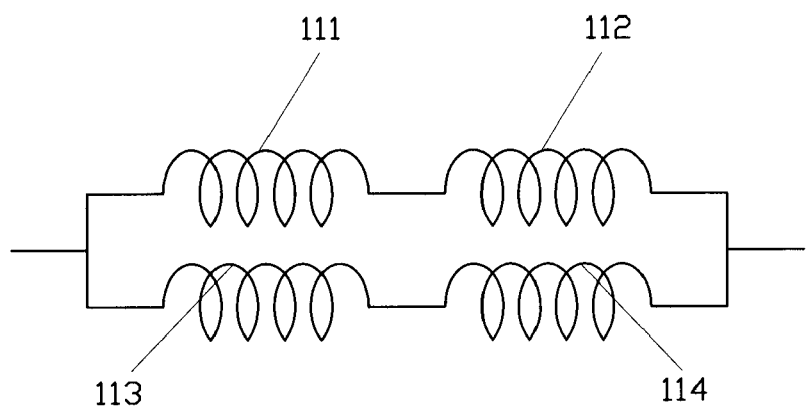

In summation of the description above, the unit coil of the present invention is comprised of a plurality of side-by-side arranged sub-coils which are equivalent inductive circuit devices 111, 112, 113, 114 as shown in FIGS. 15(a), 15(b) and 15(c). The sub-coils of the unit coil are connected in series as shown in FIG. 15(a), in parallel as shown in FIG. 15(b), or in series-parallel as shown in FIG. 15(c). The connection in series as shown in FIG. 15(a) produces a larger driving force constant. The connection in parallel as shown in FIG. 15(b) provides a smaller back EMF constant. In FIG. 15(c), four sub-coils are used for forming the unit coil, wherein the sub-coils 111, 112 of the unit coil are connected in series and the sub-coils 113, 114 are connected in series, and then the two serially connected circuits are connected in parallel, so that the driving force constant and the back EMF constant can be adjusted to achieve the required characteristics of the linear motor.

While we have shown and described the embodiment in accordance with the present invention, it should be clear to those skilled in the art that further embodiments may be made without departing from the scope of the present invention.

What is claimed is:

1. A coreless type linear motor, comprising:
a magnetic rail, including a plurality of permanent magnets installed in two opposite rows, and an action space is reserved between said two opposite rows of permanent magnets; and
a coil assembly, including a plurality of tri-phase unit coil modules alternately stacked in an axial direction, and a resin layer sealed onto said tri-phase unit coil modules, wherein said resin layer is situated at said action space of said magnetic rail, and said tri-phase unit coil modules include three sets of identical unit coils, and said unit coil includes a plurality of side-by-side arranged sub-coils having at least one bend on said axial non-action side; and
said plurality of sub-coils have upper-layer sub-coils and lower layer sub-coils, and said upper-layer coils have a vertical length shorter than the vertical length of said lower-layer sub-coils.

2. The coreless type linear motor as claimed in claim 1, wherein said plurality of side-by-side arranged sub-coils are a plurality of sub-coils with an equal width and stacked along a thickness-wise direction.

3. The coreless type linear motor as claimed in claim 1, wherein said axial non-action side of said plurality of sub-coils has two bends, and said two bends have an equal radius of curvature.

4. The coreless type linear motor as claimed in claim 1, wherein said axial non-action side of said upper-layer sub-coil of said unit coil has a cross-sectional area disposed above the total thickness of said unit coil.

* * * * *